US008495366B2

(12) United States Patent
Banerjee et al.

(10) Patent No.: US 8,495,366 B2
(45) Date of Patent: *Jul. 23, 2013

(54) SECURE KERBERIZED ACCESS OF ENCRYPTED FILE SYSTEM

(75) Inventors: Dwip N. Banerjee, Austin, TX (US); Sachin Chandrakant Punadikar, Pune (IN); Sandeep Ramesh Patil, Somers, NY (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,925

(22) Filed: Apr. 18, 2012

(65) Prior Publication Data

US 2012/0204028 A1    Aug. 9, 2012

Related U.S. Application Data

(63) Continuation of application No. 12/643,943, filed on Dec. 21, 2009.

(51) Int. Cl.
*H04L 29/06* (2006.01)
(52) U.S. Cl.
USPC .............. 713/165; 713/176; 713/179; 726/7; 726/10; 380/278; 380/279; 709/203
(58) Field of Classification Search
USPC ... 713/165, 176, 179; 380/278, 279; 709/203; 726/7, 10
See application file for complete search history.

(56) References Cited

U.S. PATENT DOCUMENTS

| 5,898,784 | A | 4/1999 | Kirby et al. ................. 713/153 |
| 5,931,947 | A | 8/1999 | Burns et al. ................. 713/201 |
| 6,405,312 | B1 | 6/2002 | Ly ................................ 13/155 |
| 6,405,315 | B1 | 6/2002 | Burns et al. ................. 713/190 |
| 6,834,341 | B1 | 12/2004 | Bahl et al. .................... 713/156 |
| 6,947,556 | B1 * | 9/2005 | Matyas et al. ................. 380/29 |
| 7,058,805 | B2 | 6/2006 | Sibert ........................... 713/161 |
| 7,069,380 | B2 | 6/2006 | Sikora et al. ................. 709/206 |

(Continued)

OTHER PUBLICATIONS

International Search Report and Written Opinion for International Application No. PCT/EP2010/069643, mailed May 2, 2011, 8 pages.

(Continued)

*Primary Examiner* — Brandon Hoffman
*Assistant Examiner* — Hee Song
(74) *Attorney, Agent, or Firm* — VanLeeuwen & VanLeeuwen; Matthew B. Talpis

(57) ABSTRACT

A file server receives a request from a client to mount an encrypted file system. The file server informs the client that the requested file system is encrypted and, in turn, receives a session ticket from the client that includes a security protocol mounting selection. The file server decrypts the client's user's encrypted private key, and then decrypts the requested encrypted file system using the private key. In turn, the file server sends the decrypted file system to the client over a secure channel, which is based upon the security protocol mounting selection. In one embodiment, a key distribution center server receives a request from the client for the client's user to access the encrypted file system at the file server. The key distribution center server retrieves an intermediate key; includes the intermediate key in a session ticket; and sends the session ticket to the client.

9 Claims, 9 Drawing Sheets

U.S. PATENT DOCUMENTS

| | | |
|---|---|---|
| 7,177,427 B1 | 2/2007 | Komuro et al. ............... 380/239 |
| 7,290,288 B2 | 10/2007 | Gregg et al. .................... 726/28 |
| 7,313,557 B1 | 12/2007 | Noveck ............................. 707/8 |
| 2004/0059912 A1* | 3/2004 | Zizzi ............................. 713/165 |
| 2005/0198490 A1 | 9/2005 | Jaganathan et al. .......... 713/151 |
| 2005/0273858 A1* | 12/2005 | Zadok et al. .................... 726/24 |
| 2006/0288230 A1 | 12/2006 | Crall et al. .................... 713/183 |
| 2007/0226320 A1 | 9/2007 | Hager et al. .................. 709/219 |
| 2009/0031128 A1* | 1/2009 | French et al. ................. 713/164 |
| 2009/0106348 A1 | 4/2009 | Banerjee et al. .............. 709/203 |
| 2009/0110198 A1* | 4/2009 | Garimella et al. ............ 380/277 |
| 2009/0110200 A1* | 4/2009 | Srinivas ......................... 380/279 |
| 2009/0150989 A1* | 6/2009 | Hoey et al. ....................... 726/10 |
| 2010/0095127 A1 | 4/2010 | Banerjee et al. .............. 713/179 |

OTHER PUBLICATIONS

Office Action for U.S. Appl. No. 12/248,982, mailed May 25, 2011, 21 pages.

Final Office Action for U.S. Appl. No. 12/248,982, mailed Oct. 27, 2011, 32 pages.

\* cited by examiner

SECURE KERBERIZED ACCESS OF ENCRYPTED FILE SYSTEM

RELATED APPLICATION

This application is a continuation of U.S. application Ser. No. 12/643,943, filed Dec. 21, 2009, titled "Secure Kerberized Access of Encrypted File System," and having the same inventors as the above-referenced application.

BACKGROUND

An encrypted file system (EFS) is a secure file system that allows a user to securely store data utilizing symmetric and asymmetric cryptography. Encrypted file systems are typically supported on a single machine, and in order for a user to access the encrypted file systems, the user logs onto the same machine that stores the encrypted file systems.

A network file system (NFS) is a distributed file system that allows users to export data from one machine (server) and import/mount it from other machines (clients). Although network file systems may require passwords for a user to access particular file systems, the file systems themselves are typically unencrypted.

SUMMARY

A file server receives a request from a client to mount a file system, which the file server determines to be encrypted. The file server sends a message to the client that informs the client that the requested file system is encrypted and, in turn, the file server receives a session ticket from the client that includes a security protocol mounting selection. The file server decrypts an encrypted private key corresponding to the client's user, which results in a private key. The file server then decrypts the requested encrypted file system using the private key, and sends the decrypted file system to the client over a secure channel, which is based upon the client's security protocol mounting selection.

In one embodiment, a key distribution center server receives a request from the client to access the encrypted file system at the file server. The key distribution center server retrieves an intermediate key (corresponding to both the file server and the client's user), which is adapted to decrypt the encrypted private key at the file server. In turn, the key distribution center server includes the intermediate key in a session ticket, and sends the session ticket to the client.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
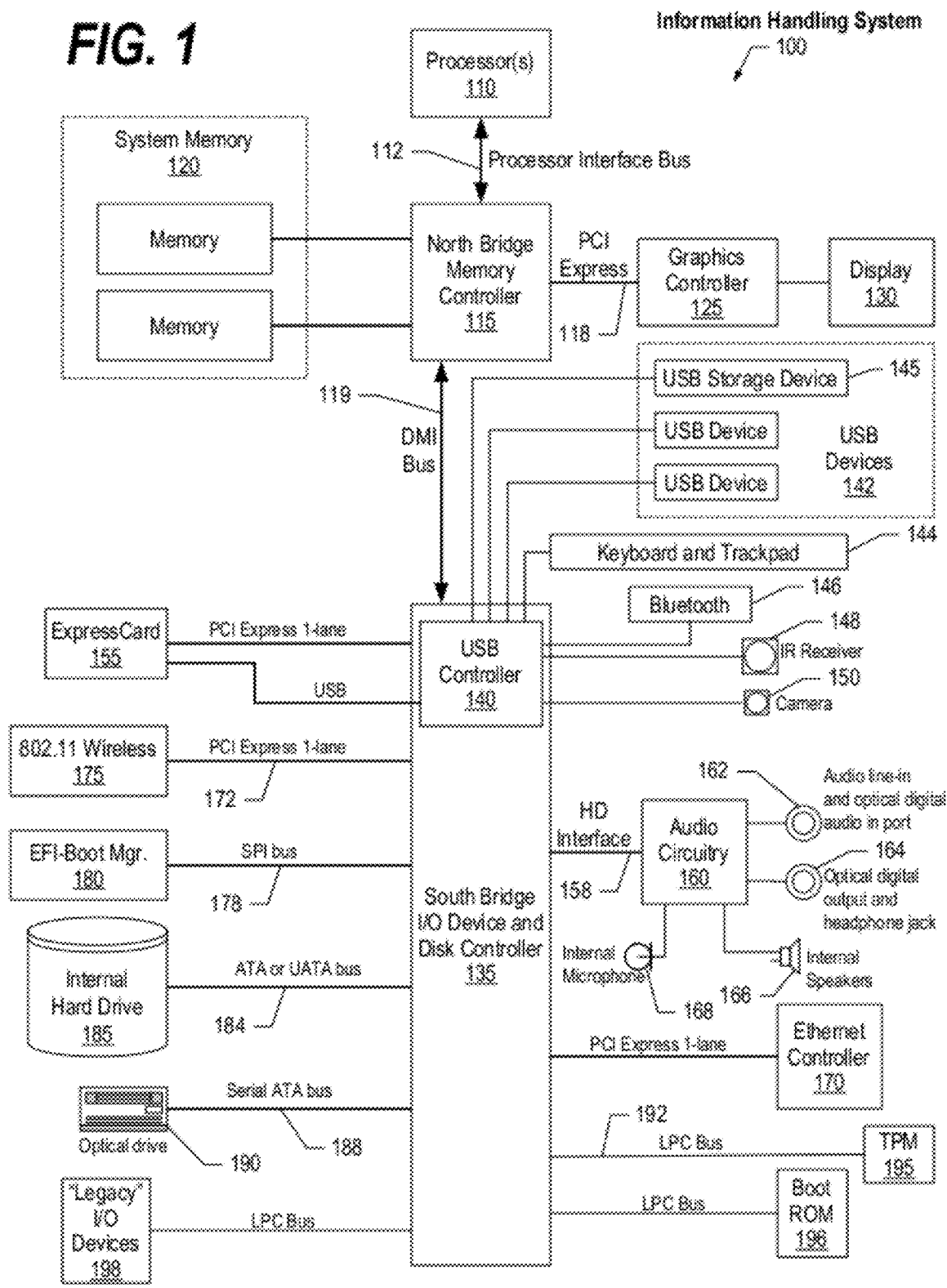
FIG. 1 is a block diagram of a data processing system in which the methods described herein can be implemented.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
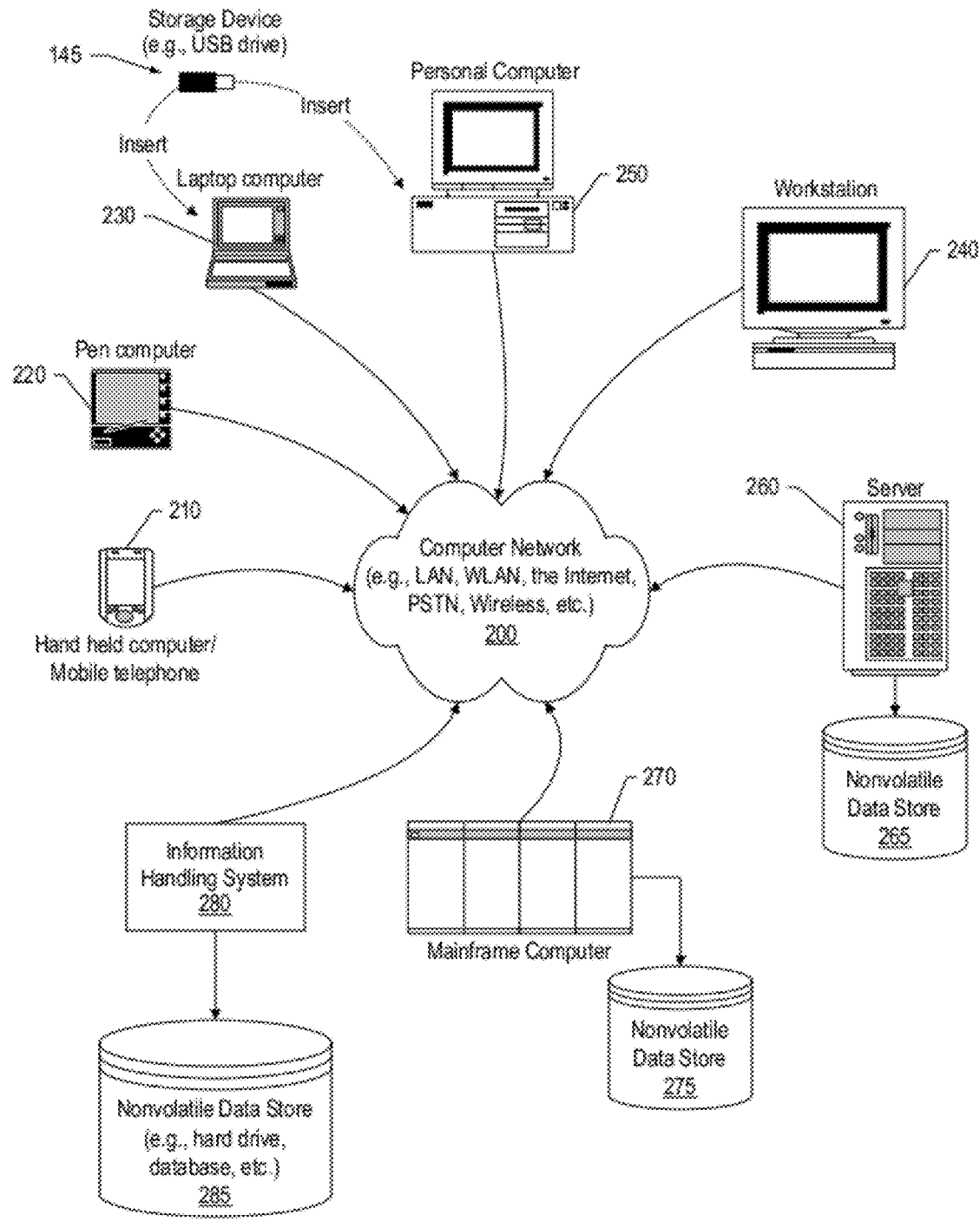
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
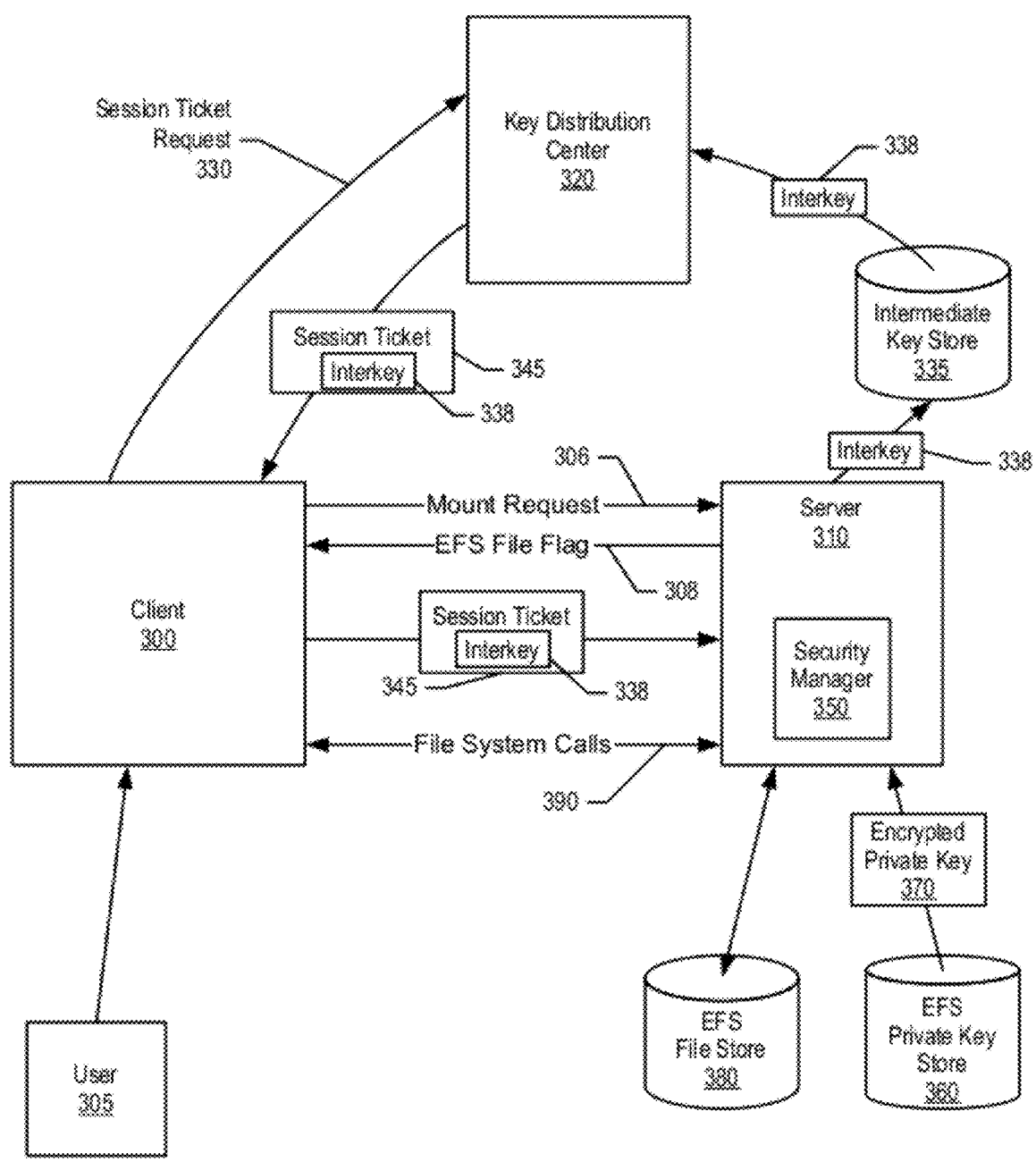
FIG. 3 is a diagram showing a client accessing an encrypted file system located on a file server over a secure Kerberos channel.

FIG. 3 is a diagram showing a client accessing an encrypted file system located on a file server over a secure Kerberos channel. Client 300 communicates with file server 310 over a network protocol, such as a network file system (NFS). Client 300 and server 310 utilize key distribution center 320 for authentication purposes and establishing a secure channel. For example, key distribution center 320 may be a Kerberos server that authenticates client 300 and server 310, and provides session tickets to client 300 to communicate with server 310. Server 310 manages encrypted file systems (EFS) stored on EFS file store 380 using an encryption mechanism, such as an Advanced Interactive executive encrypted file system (AIX EFS).

When user 305 configures an encrypted file system on server 310, server 310 creates a private key for user 305 to encrypt and decrypt user 305's particular file systems. Server 310 receives a password from user 305, for which security manager 350 generates an "intermediate key." Security manager 350 stores the intermediate key (intermediate key 338) in intermediate key store 335 and also uses intermediate key 338 to encrypt the user's private key, resulting in encrypted private key 370, which is stored in EFS private key store 360 (see FIG. 5 and corresponding text for further details). Security manager 350 uses the user's private key to encrypt the user's file systems stored in EFS store 380.

When user 305 wishes to access the encrypted file systems, user 305 uses client 300 to send mount request 306 to server 310. Server 310 determines whether mount request 306 is a request to access unencrypted file systems or encrypted file systems. In the example shown in FIG. 3, mount request 306 is a request to access an encrypted file system. As such, server 310 sends EFS file flag message 308 to client 300, which informs client 300 that mount request 306 corresponds to an encrypted file system.

In turn, client 300 sends session ticket request 330 to key distribution center 320, which indicates user 305 requests access to an encrypted file system on server 310. Key distribution center 320 identifies server 310's intermediate key store 335, and retrieves intermediate key 338, which is the same intermediate key that was generated earlier. Key distribution center 320 includes intermediate key 338 in session ticket 345, and sends session ticket 345 to client 300. In one embodiment, when key distribution center 320 is not able to locate intermediate key, user 305 provides client 300 with an encrypted file system password, which client 300 sends to server 310 in order for server 310 to re-create the intermediate key (see FIGS. 6, 8, 9, and corresponding text for further details).

Due to the fact that server 310 informed client 300 that the requested file system is encrypted (via EFS file flag 308), client 300 automatically selects a security protocol mounting selection (e.g., kbr5p) and sends the mounting selection, along with session ticket 345, to server 310. In turn, security manager 350 uses intermediate key 338 included in session ticket 345 to decrypt encrypted private key 370. Security manager 350 then uses the decrypted private key to decrypt the requested encrypted file system stored in EFS file store 380 and process file system calls 390 between client 300 and server 310 accordingly.

Figure 4:
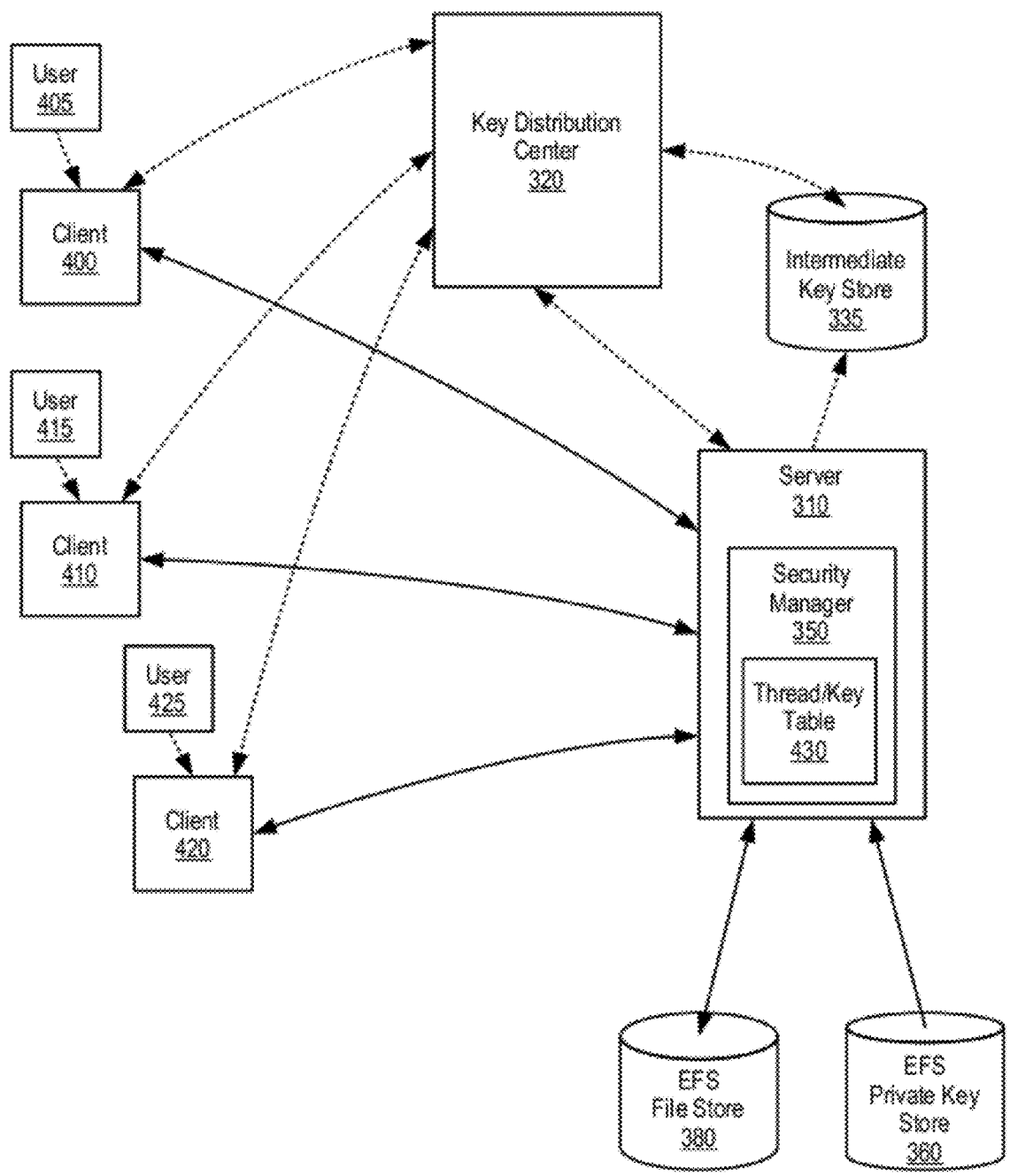
FIG. 4 is a diagram showing a server providing encrypted file system access to multiple clients over multiple threads by assigning private keys on a per thread basis.

FIG. 4 is a diagram showing a server providing encrypted file system access to multiple clients over multiple threads by assigning private keys on a per thread basis. Server 310 includes thread/key table 430, which correlates actively running threads to users' private keys. As such, server 310 supports multiple EFS sessions for multiple users (405, 415, and 425) using multiple clients (400, 410, and 420).

User 405 wishes to access an encrypted file system located at server 310. As such, client 400 sends a request to key distribution center 320, which retrieves user 405's intermediate key from intermediate key store 335 and sends the intermediate key to client 400. In turn, client 400 provides user 405's intermediate key to server 310. Security manager retrieves user 405's encrypted private key from EFS private key store 360 and decrypts the encrypted private key using user 405's intermediate key. Security manager 350 then stores the decrypted private key, along with user 405's session number, in thread/key table 430. Likewise, security manager 350 decrypts and stores private keys for user 415 and user 425 and associates their private keys with corresponding session threads. As a result, server 310 provides simultaneous encrypted file system support to multiple users.

Figure 5:
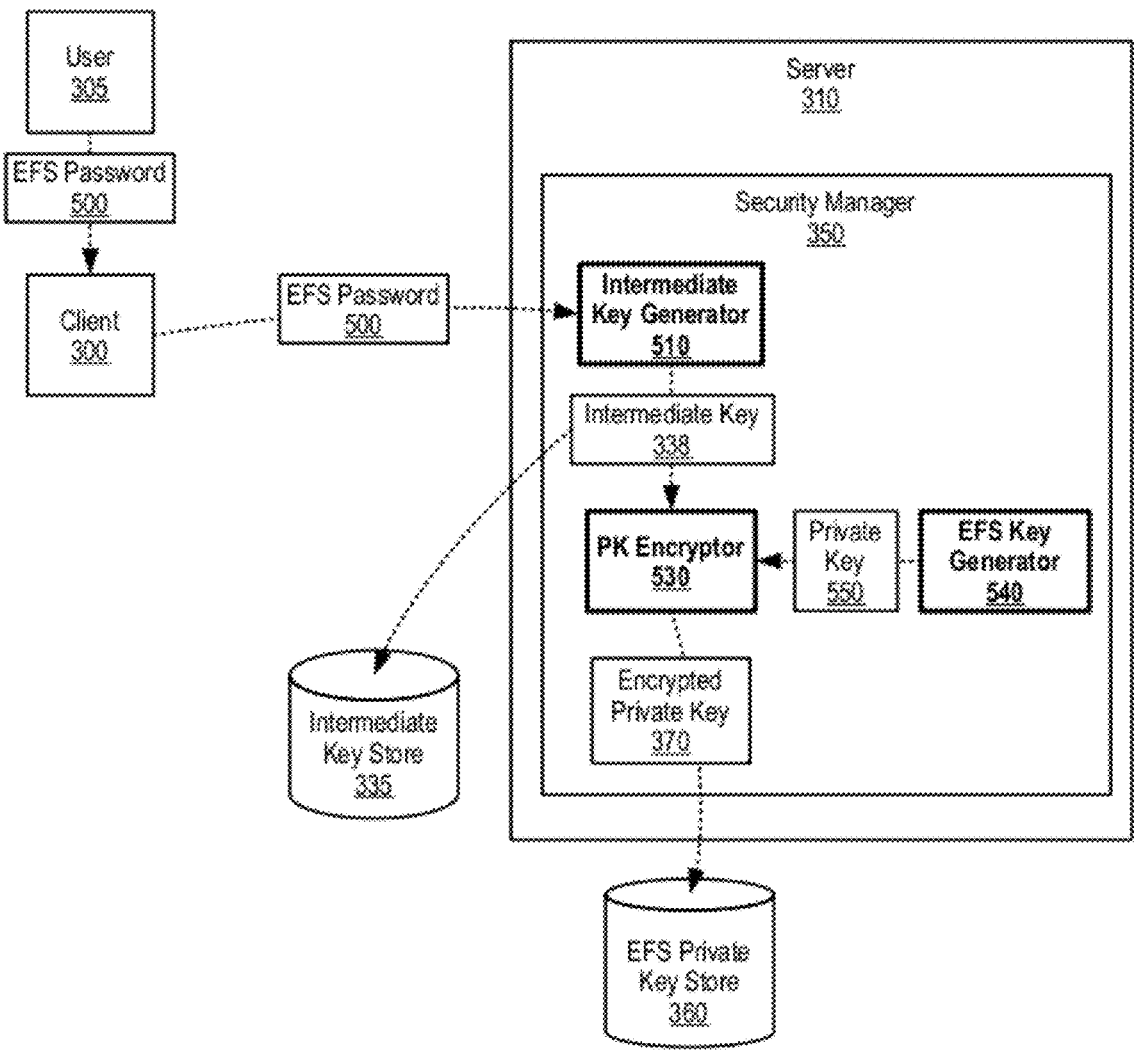
FIG. 5 is a diagram showing a server generating an intermediate key and a private key based upon a user's password.

FIG. 5 is a diagram showing a server generating an intermediate key and a private key based upon a user's password. User 305 wishes to encrypt and store file systems managed by server 310. User 305 begins by providing encrypted file system (EFS) password 500 to client 300, which provides EFS password 500 to server 310. Security manager 350 includes intermediate key generator 510, private key encryptor 530, and EFS key generator 540. Intermediate key generator 510 generates intermediate key 338 using a function such as an S2K (string to key) function. As those skilled in the art can appreciate, the S2K function may include a message digest algorithm and a pseudo-random number generator.

Security manager 350 stores intermediate key 338 in intermediate key store 335 and assigns intermediate key 338 to user 305. In turn, a key distribution server may retrieve intermediate key 338 from intermediate key store 335 and provide intermediate key 338 back to client 300 when user 305 wishes to access an encrypted file system located at server 310 (see FIG. 6 and corresponding text for further details).

EFS key generator 540 is a module that generates asymmetric keys for a user, which includes private key 550. EFS key generator 540 may include, for example, an algorithm specific for an encrypted file system to generate the private keys, such as an RSA (Rivest, Shamir and Adleman) 2048 bit private key. Security manager 350 utilizes private key 550 to encrypt user 305's file systems. Private key encryptor 530 encrypts private key 550 with intermediate key 338, thus creating encrypted private key 370, which is stored in EFS private key store 360. As can be seen, in order to reproduce private key 550, security manager must receive either intermediate key 338 from client 300 or EFS password 500 from user 305 (see FIGS. 6, 7, and corresponding text for further details).

Figure 6:
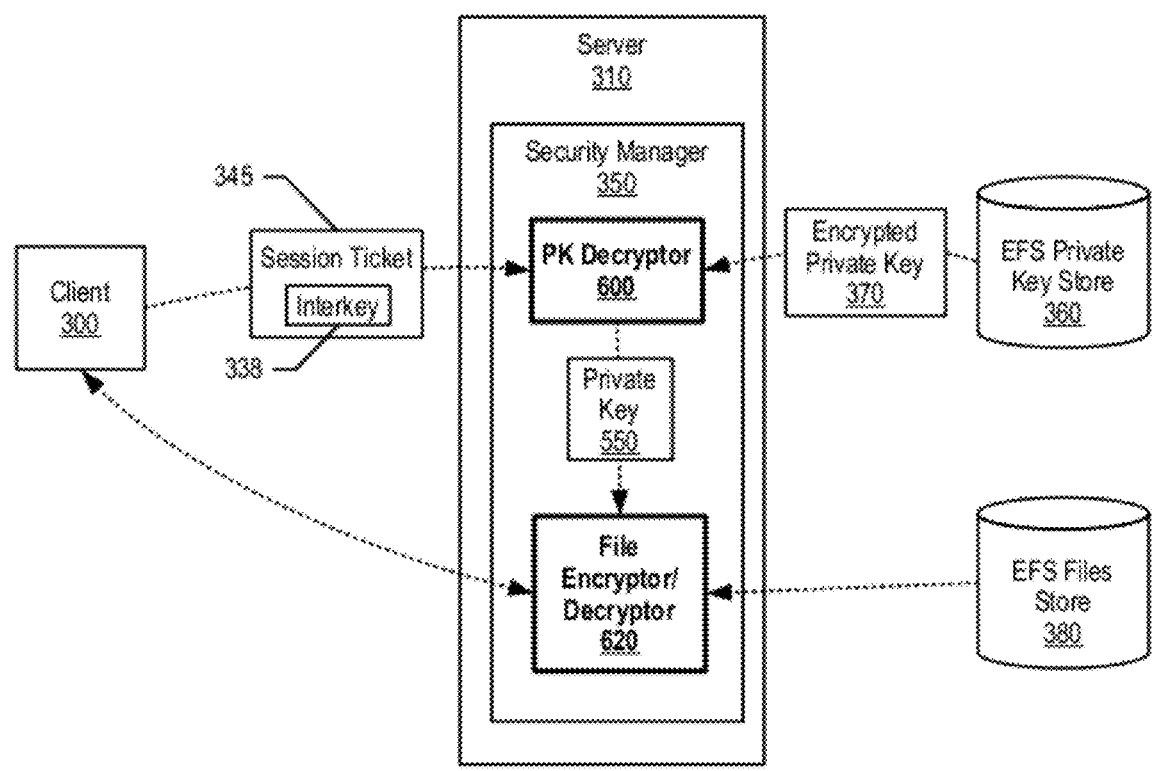
FIG. 6 is a diagram showing a server receiving an intermediate key from a client and the server using the intermediate key to reproduce a user's private key.

FIG. 6 is a diagram showing a server receiving an intermediate key from a client and the server using the intermediate key to reproduce a user's private key. Client 300 receives session ticket 345 from a key distribution center (KDC), which includes intermediate key 338 (see FIG. 3 and corresponding text for further details). Server 310 detects that session ticket 345 includes intermediate key 338, and instructs security manager 350 to extract intermediate key 338 and use intermediate key 338 to decrypt encrypted private key 370 using private key decryptor 600, thus producing private key 550.

In turn, file encryptor/decryptor 620 uses private key 550 to encrypt and decrypt file systems located on EFS files store 380, and process file system calls with client 300 over a secure Kerberos channel.

Figure 7:
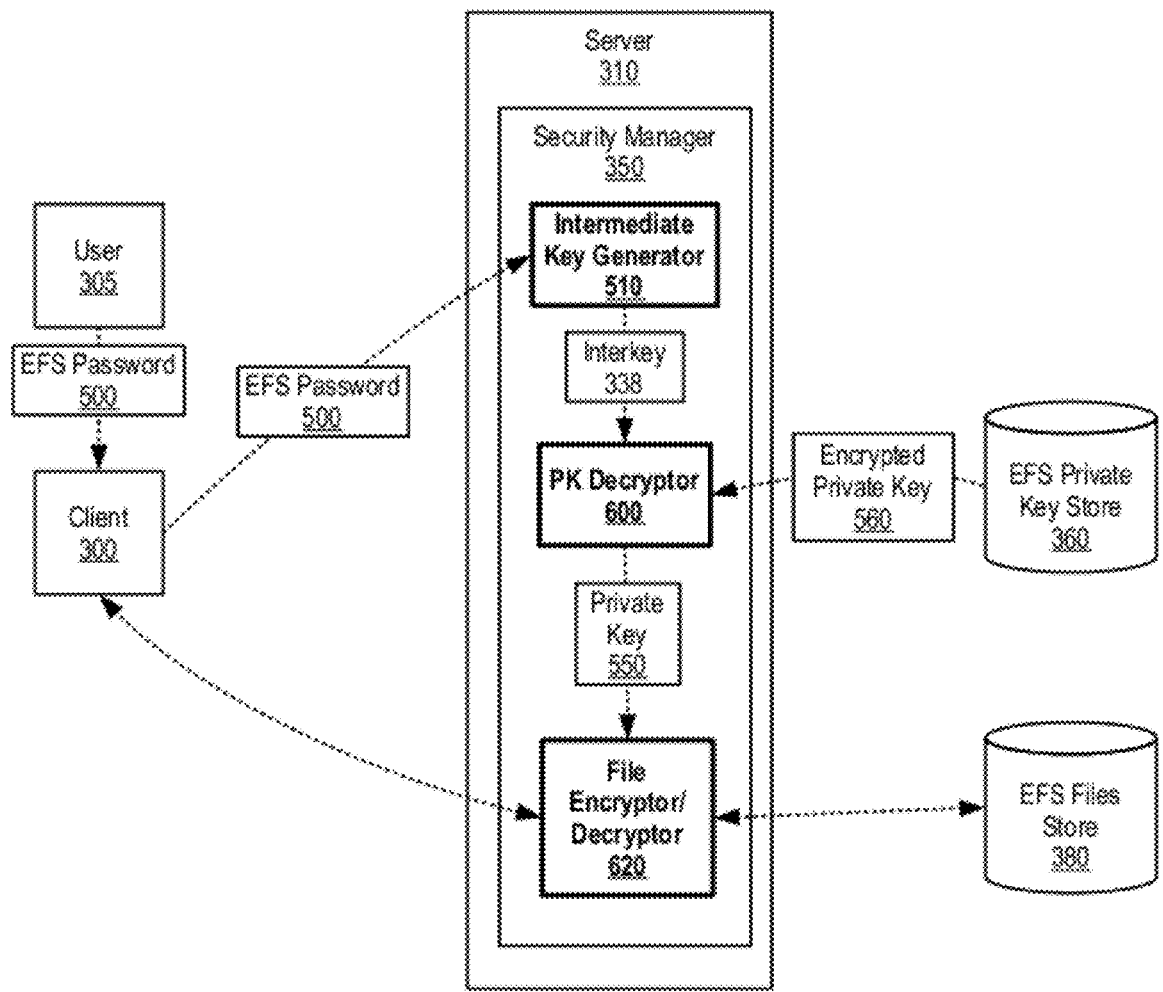
FIG. 7 is a diagram showing a server receiving an encrypted file system (EFS) password and using the EFS password to reproduce a private key.

FIG. 7 is a diagram showing a server receiving an encrypted file system (EFS) password and using the EFS password to reproduce a private key. In embodiments when a client's session key does not include an intermediate key, the user is prompted for an EFS password in order for the server to recreate the intermediate key from the password. In these embodiments, user 305 provides EFS password 500 to client 300, which passes EFS password 500 to server 310.

Intermediate key generator 510 uses EFS password to reproduce intermediate key 338, similar to that shown in FIG. 5 (intermediate key generator 510 first creating intermediate key 338). Next, private key decryptor 600 decrypts encrypted private key 560 using intermediate key 338, thus producing private key 550. In turn, file encryptor/decryptor 620 uses private key 550 to encrypt and decrypt file systems located on EFS files store 380, and process file system calls with client 300 over a secure Kerberos channel.

Figure 8:
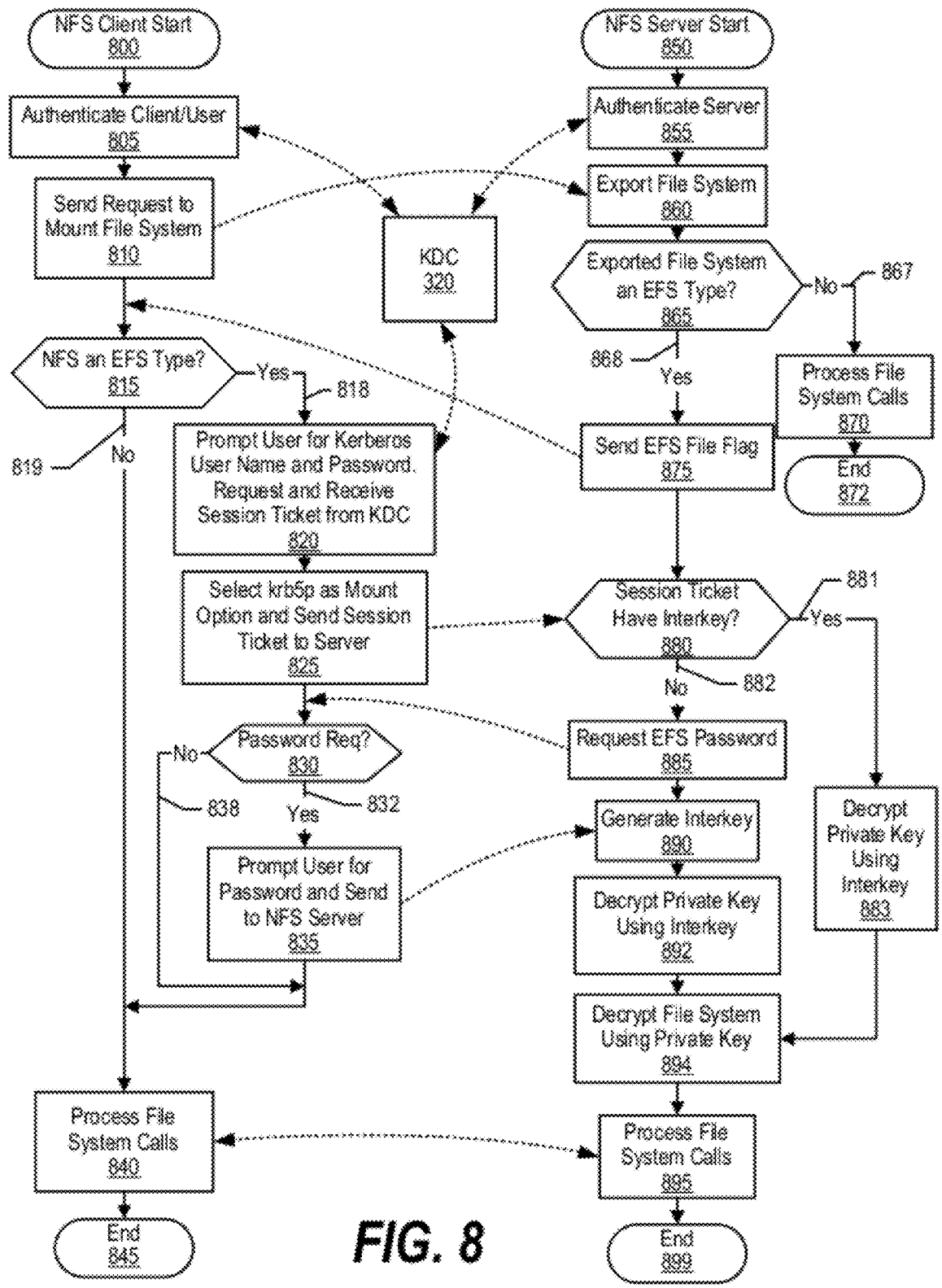
FIG. 8 is a flowchart showing steps taken in providing a client access to an encrypted file system located on a server over a secure Kerberos channel.

FIG. 8 is a flowchart showing steps taken in providing a client access to an encrypted file system located on a server over a secure Kerberos channel. Client processing commences at 800, whereupon the client authenticates itself and its user with key distribution center (KDC) 320 at step 805. Server processing commences at 850, whereupon the server also authenticates itself with KDC 320 at step 855.

At step 810, the client sends a request to the server to mount a file that is managed by the server. The server receives the client request at step 860, and the server determines whether the requested file system is an encrypted file system (decision 865). For example, the file system may be encrypted using a private key that corresponds to the client's user. If the file system is an unencrypted file system, decision 865 branches to "No" branch 867 whereupon the server processes file system calls with the client, such as providing access and changes to the unencrypted file system (step 870 and the client's step 840). Server processing ends at 872.

On the other hand, if the file system is encrypted, decision 865 branches to "Yes" branch 868, whereupon the server sends a message that informs the client that the requested file system is encrypted (step 875). At the client, the client determines, based upon the received message, whether the requested file system is encrypted (decision 815). If the file system is not encrypted, decision 815 branches to "No" branch 819 whereupon the client processes file system calls with the server (step 840 and server's step 870 discussed above), and client processing ends at 845.

On the other hand, if the server's message indicates that the requested file system is an encrypted file system, decision 815 branches to "Yes" branch 818, whereupon the client prompts the user for a Kerberos user name and password in order to receive a session ticket from KDC 320 that allows the client to communicate with the server over a secure Kerberos channel (step 820). KDC 320 provides the session ticket, which may or may not include an intermediate key based upon whether KDC 320 is able to locate the server's intermediate key storage area (see FIG. 9 and corresponding text for further details).

Once the client receives the session ticket from KDC 320, the client automatically selects a secure mounting option, such as a Kerberos "krb5p" mounting selection, and sends the mounting selection along with the session ticket to the server (step 825).

At the server, the server determines whether the received session ticket includes the intermediate key (decision 880). If the session ticket includes the intermediate key, decision 880 branches to "Yes" branch 881, whereupon the server extracts the intermediate key from the session ticket and decrypts the client's encrypted private key using the intermediate key at step 883. At step 894, the server decrypts the encrypted file system, resulting in an unencrypted file system. The server then processes file system related calls between the server and client (step 895 and step 840) using the decrypted file system.

On the other hand, if the session ticket does not include the intermediate key, decision 880 branches to "No" branch 882, whereupon the server requests an encrypted file system password from the client at step 885. At the client, a determination is made as to whether the client received the request to provide a password (decision 830). If the server sent a message to request a password, decision 830 branches to "Yes" branch 832, whereupon the client prompts the user to provide for the user's encrypted file system password, and the client sends the password to the server at step 835. The encrypted file system password is specific to the user because the user's intermediate key is derived from the password (see FIG. 5 and corresponding text for further details). On the other hand, if the server did not request a password (e.g., the session ticket included the intermediate key), decision 830 branches to "No" branch 838 bypassing password prompting steps.

At step 890, the server receives the password and generates the intermediate key (see FIG. 7 and corresponding text for further details). Next, the server decrypts the encrypted private key using the generated intermediate key (step 892) and, in turn, decrypts the encrypted file system using the decrypted private key at step 894. The server and client then processes file system related calls using the decrypted file system (steps 895 and 840). Client processing ends at 845 and server processing ends at 899.

Figure 9:
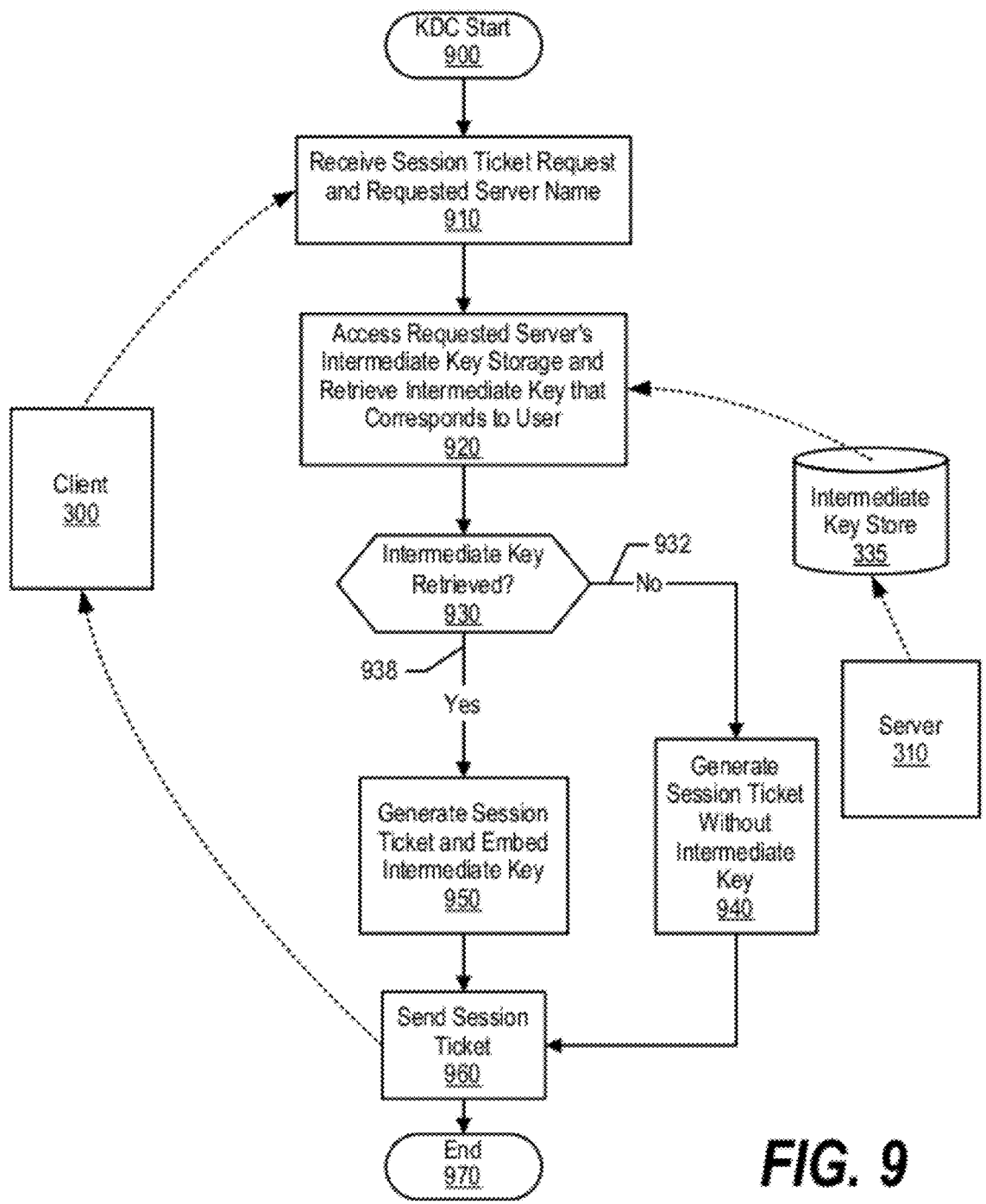
FIG. 9 is a flowchart showing steps taken in a key distribution center (KDC) providing a session ticket to a client.

FIG. 9 is a flowchart showing steps taken in a key distribution center (KDC) providing a session ticket to a client. Processing commences at 900, whereupon the KDC receives a session ticket request from client 300 to communicate with a particular server, such as server 310 (step 910). In one embodiment, prior to receiving the session ticket request, the KDC received a ticket granting ticket (TGT) request from client 300. In this embodiment, the KDC provided the TGT to client 300 and, in turn, client 300 included the TGT in client 300's session request.

At step 920, the KDC accesses intermediate key store 335 and attempts to retrieve an intermediate key that corresponds to client 300's user. Intermediate store 335 is a storage area managed by server 310 and includes intermediate keys for users that have encrypted file systems stored at server 310. In one embodiment, the KDC accesses intermediate store 335 via a secure communication channel between the KDC and server 310. In this embodiment, the KDC uses server 310's IP (Internet protocol) address and the user's user name to identify the user's corresponding intermediate keys.

In another embodiment, the KDC may manage a database that securely stores EFS intermediate keys for each user (apart from regular Kerberos keys). In this embodiment, schema changes to the KDC database may include:

<User Name><hostname/IP address><EFS Interkey> such as <user1> <9.182.288.23> <Key1> and <user 1> <9.182.288.24><Key2>. In this embodiment, the KDC database maintains EFS Keys for "user 1" where the first entry indicates user 1's EFS intermediate key for a first server with an IP address <9.182.288.23>, and the second entry indicates user 1's EFS intermediate key for second server with an IP address of <9.182.288.24>. In this embodiment, both servers manage an encrypted file system and communicate with clients via a network file system (NFS). In another embodiment, the KDC may securely contact an LDAP (lightweight directory access protocol) server (centralized server) that stores EFS intermediate keys for all users on a per machine basis within a computer network.

Once the KDC attempts to retrieve the user's intermediate key, a determination is made as to whether the KDC was successful in locating and retrieving the intermediate key (decision 930). If the KDC retrieved the intermediate key, decision 930 branches to "Yes" branch 938, whereupon the KDC generates a session ticket and embeds the intermediate key in the session ticket (step 950). On the other hand, if the KDC was not able to retrieve the intermediate key, decision 930 branches to "No" branch 932, whereupon the KDC generates the session ticket without the intermediate key (step 940).

At step 960, the KDC sends the generated session ticket to client 300 (which may or may not include the intermediate key as discussed above). KDC processing ends at 970.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving a request from a client at a file server for the client to mount a file system located at the file server;
   determining, at the file server, that the requested file system is encrypted;
   sending a message from the file server to the client that informs the client that the requested file system is encrypted;
   receiving a session ticket from the client that includes a security protocol mounting selection;
   decrypting an encrypted private key at the file server that corresponds to a user, the decrypting resulting in a private key;
   decrypting the file system at the file server using the private key;
   and
   sending the decrypted file system from the file server to the client over a secure channel corresponding to the security protocol mounting selection.

2. The method of claim 1 further comprising:
   wherein the file system is an advanced interactive executive encrypted file system;
   wherein the file server and the client communicate using a network file system format that allows the user to access files from the file server in a distributed manner; and
   wherein the security protocol mounting selection is a Kerberos protocol that allows the client and the file server to communicate securely over a computer network.

3. The method of claim 1 wherein decrypting the encrypted private key further comprises:
   determining whether the session ticket includes an intermediate key;
   in response to determining that the session ticket includes the intermediate key, extracting the intermediate key from the session ticket and decrypting the encrypted private key using the extracted intermediate key; and
   in response to determining that the session ticket fails to include the intermediate key, the method further comprising:
      sending a request from the file server to the client for an encrypted file system password;
      receiving the encrypted file system password from the client at the file server;
      generating the intermediate key from the encrypted file system password located at the file server; and
      decrypting the encrypted private key using the generated intermediate key.

4. The method of claim 3 wherein the intermediate key is provided to the client by a key distribution center server, the key distribution center server being different than the file server and adapted to retrieve the intermediate key from a storage area managed by the file server.

5. The method of claim 1 wherein the file server manages a plurality of session threads, each of the plurality of session threads corresponding to one of a plurality of users and associated with one of a plurality of private keys, the user included in the plurality of users and the private key included in the plurality of private keys.

6. The method of claim 1 wherein the client automatically selects the security protocol mounting selection in response to receiving the message from the file server that the requested file system is encrypted.

7. A method comprising:
   receiving a request at a key distribution center server from a client, the requesting identifying a user and a file server;
   retrieving an intermediate key that corresponds to both the file server and the user, wherein the intermediate key is adapted to decrypt an encrypted private key utilized by the file server for decrypting encrypted file systems;
   including the intermediate key in a session ticket; and
   sending the session ticket to the client.

8. The method of 7 further comprising:
   identifying, at the key distribution center server, an internet protocol address that corresponds to the file server;
   extracting a user name from the request that corresponds to the user; and
   locating the intermediate key in an intermediate storage area managed by the file server using the internet protocol address and the user name.

9. The method of claim 7 wherein the key distribution center server manages an intermediate key storage area that includes a plurality of intermediate keys, each of the plurality of intermediate keys corresponding to one of a plurality of users, the method further comprising:
   selecting an intermediate key from the plurality of intermediate keys, wherein the selected intermediate key is associated with both the file server and the user; and
   including the intermediate key in the session ticket that is sent to the client.

* * * * *